(12) United States Patent
Thompson

(10) Patent No.: US 6,371,495 B2
(45) Date of Patent: Apr. 16, 2002

(54) TROLLEY WITH FOLD-OUT LEGS

(75) Inventor: Eric Thompson, Renton, WA (US)

(73) Assignee: Intellotech N.V. (AN)

( * ) Notice: Subject to any disclaimer, the term of this patent is extended or adjusted under 35 U.S.C. 154(b) by 0 days.

(21) Appl. No.: 09/769,186

(22) Filed: Jan. 24, 2001

Related U.S. Application Data

(60) Provisional application No. 60/177,759, filed on Jan. 24, 2000.

(51) Int. Cl.[7] .................................................. B62B 1/04
(52) U.S. Cl. ..................... 280/30; 108/14; 280/47.18; 280/47.26; 312/240
(58) Field of Search ............................. 312/240, 241; 108/11, 14, 129; 280/30, 37, 652, 654, 47.18, 47.24, 47.26, 47.29, 47.33

(56) References Cited

U.S. PATENT DOCUMENTS

| | | | | |
|---|---|---|---|---|
| 2,944,862 A | * | 7/1960 | Heil | 312/241 |
| 3,186,780 A | * | 6/1965 | Schaerf | 312/241 |
| 5,687,978 A | * | 11/1997 | Rhodes et al. | 280/47.3 |
| 5,906,381 A | * | 5/1999 | Hovatter | 280/47.18 |
| 5,957,472 A | * | 9/1999 | Borgatti | 280/30 |
| 6,012,729 A | * | 1/2000 | Lin | 280/47.18 |
| 6,068,355 A | * | 5/2000 | Thorp | 280/30 |
| 6,152,462 A | * | 11/2000 | Barrett | 280/47.24 |

* cited by examiner

Primary Examiner—Michael Mar
(74) Attorney, Agent, or Firm—J. Michael Neary

(57) ABSTRACT

This invention is a special trolley system that attaches to a case or other object needing mobility. The trolley has the capability of having legs integrated into the mechanism, which, when unfolded, allow the case to function as a table. This functionality is particularly useful for applications where technology is being deployed to areas without existing infrastructure, such as telemedicine, military, etc.

10 Claims, 8 Drawing Sheets

TROLLEY WITH FOLD-OUT LEGS

This application claims benefit of Provisional Application 60/177,759 filed Jan. 24, 2000.

BACKGROUND OF THE INVENTION

1. Field of the Invention

This invention pertains to a wheeled support mechanism that can be attached to a case or mobile system and functions as both a trolley with wheels and as a support system, transforming the case into a standalone table. If needed the trolley part of the invention can be removed from the table component. The trolley component allows the case to be attached easily and stands upright without support with the case attached.

2. Background Art

Trolley systems for transport of luggage and electrical equipment exist in many forms, but none have the ability to convert easily into a table after transport. Moreover, there are no trolley systems having the ability to clip the trolley on and off the case system without adding a protrusion that increases the depth dimension of the case or mobile system.

SUMMARY OF THE INVENTION

Accordingly, this invention provides a trolley that mounts quickly and easily to the article it is to transport. Once mounted, the trolley is solidly secured to the case, and legs on the trolley system can be extended to make a table. Because the trolley already is secured to the case, no further attachment mechanism is needed to attain the table functionality of the system. The user has no need to worry about losing the trolley or finding storage for it as it remains attached to the case when in the upright table position. The trolley can also be removed from the case and folded flat for stowage.

DETAILED DESCRIPTION OF THE PREFERRED EMBODIMENT

Figure 1:
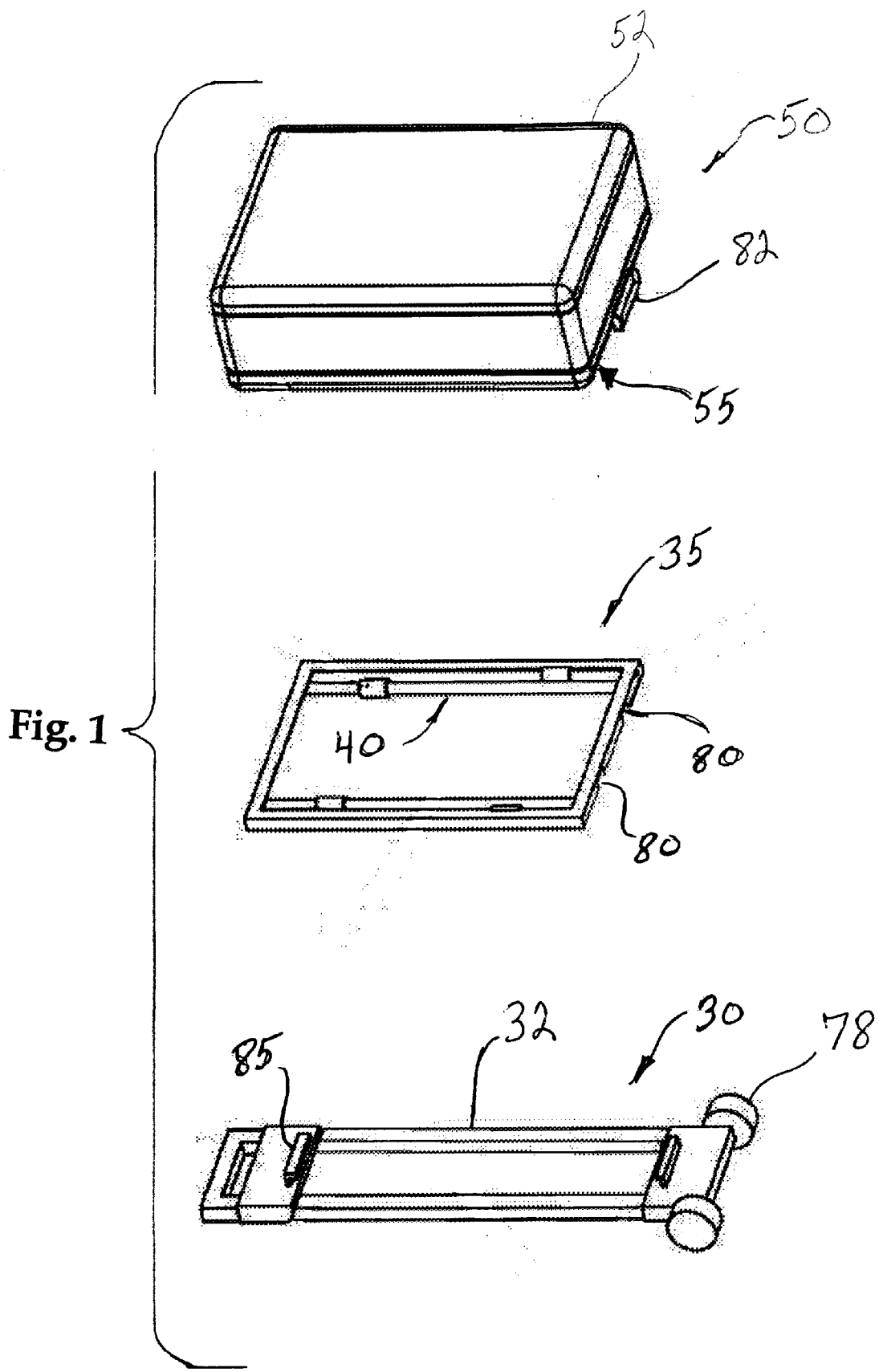
FIG. 1 is an exploded perspective view of an apparatus according to this invention, including a trolley, a table frame and legs, and a case for holding the instruments to be deployed in the system.

Turning now to the drawings, wherein like reference numerals designate identical or corresponding parts, and more particularly to FIG. 1 thereof, a wheeled support apparatus in accordance with this invention is shown having a trolley 30, a separable table with folding legs 40, and a case 50 having a lid 52 and a base 55 that can be securely attached to the table 35.

Figure 2:
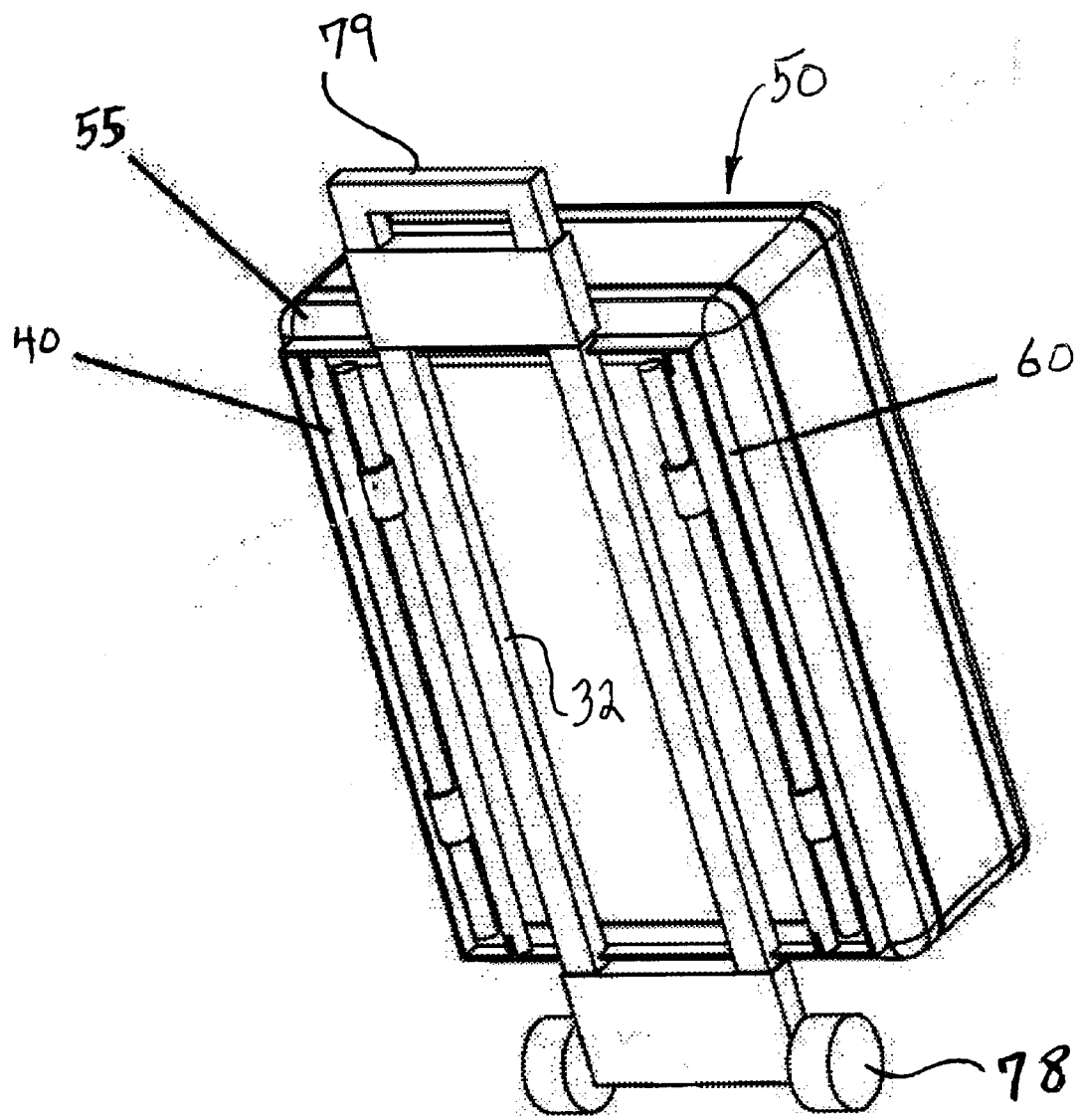
FIG. 2 is a perspective view of the apparatus shown in FIG. 1, assemble for transport FIG. 3. Is a perspective view of the apparatus shown in FIG. 1 in its erected state with the fold out legs in a fully deployed position and the case lid removed for access to the instruments mounted on the case base, as it would be set up for use in the field of office environment.
Figure 3:
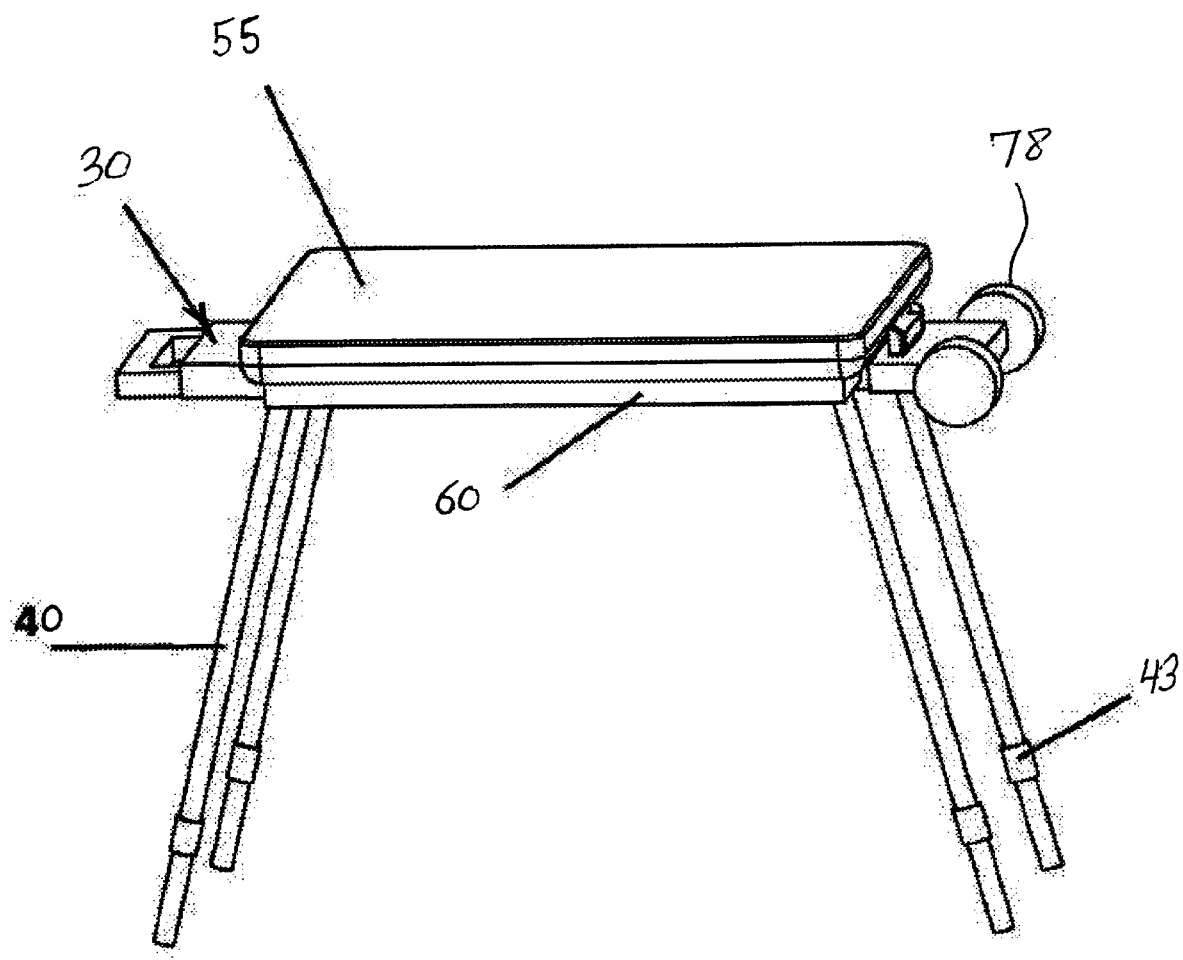
Figure 4:
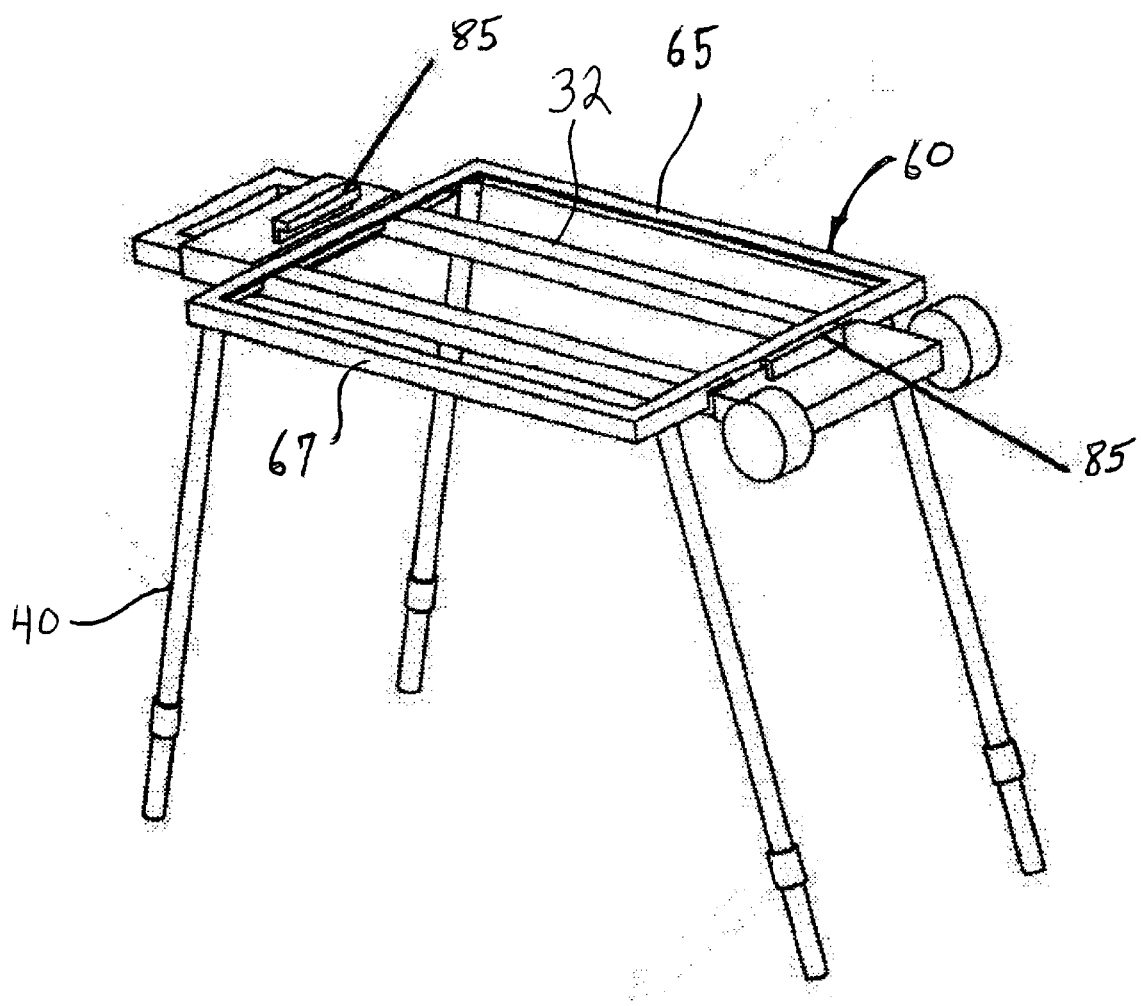
FIG. 4 is a perspective view of the apparatus shown in FIG. 3, but with the case base removed.

The apparatus shown in FIG. 1 can be assembled in a secure package as shown in FIG. 2 ready for transport, and when it arrives at its destination it can be rapidly erected for use in the field or elsewhere as shown in FIG. 3, with the lid 52 of the case 50 removed for using the instruments (not shown) attached to the base 55. The legs 40 can be lengthened to any convenient working height by telescoping leg extensions 42 which can be fixed at the desired height with locking ferrules 43 which securely clamp the legs 40 and leg extensions together until released. This enables the table frame to be elevated to any convenient height within the range of the extendible legs, from sitting height, for use with computing, medical and/or communications equipment, to standing height, for certain optical and photographic instruments. As shown in FIG. 4, the case 50 can also be removed from the erected table/trolley 35/30 if desired, leaving the erected table/trolley available for other uses.

Figure 5:
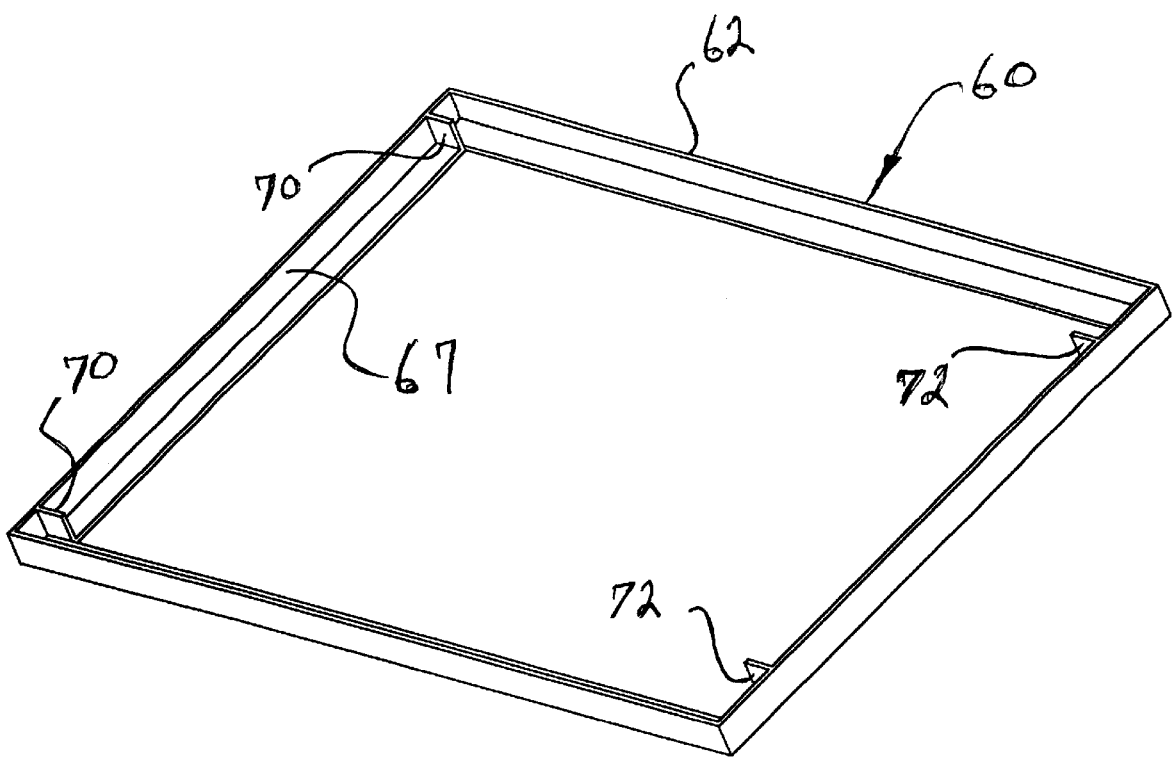
FIG. 5 is a perspective view from the underside of the table frame shown in FIG. 4.
Figure 6:
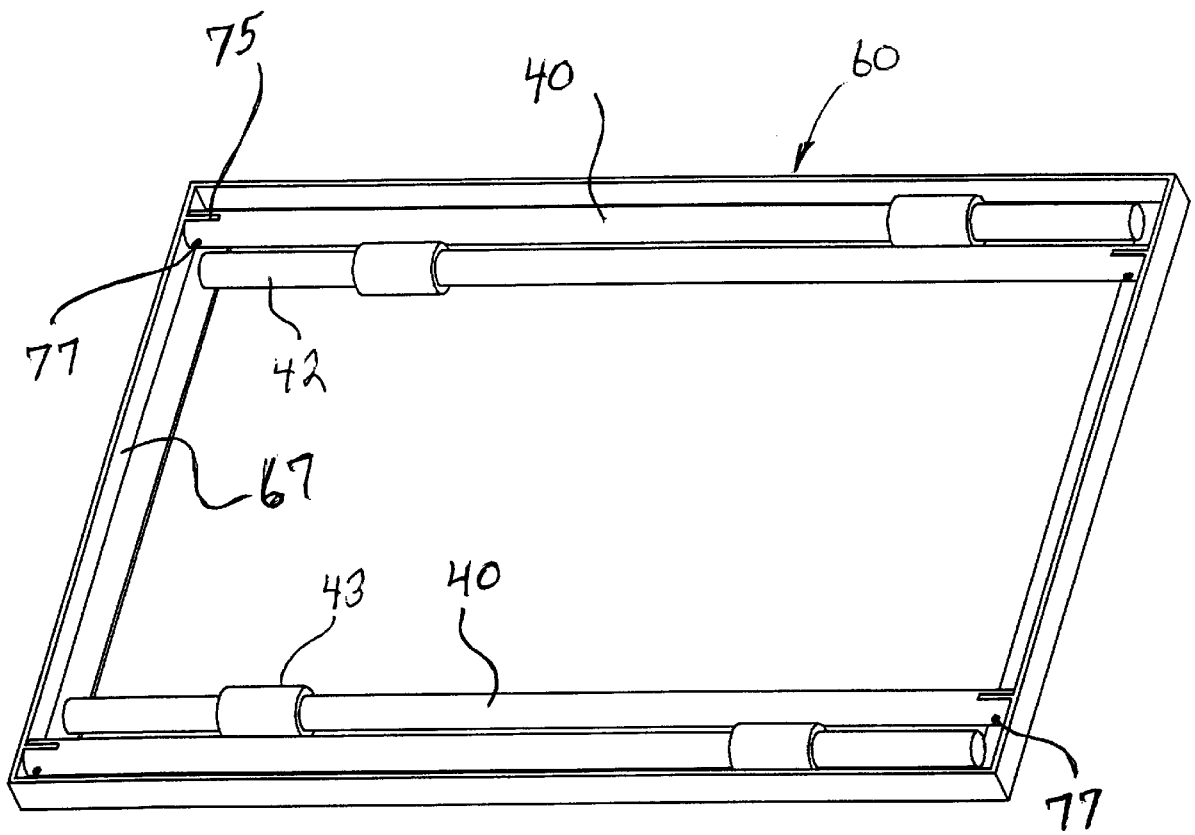
FIG. 6 is a perspective view of the table frame shown in FIG. 5, with the pivoting legs attached.

As shown in FIG. 5, the table 35 includes a table frame 60 made of angle bars 62 welded together in a rectangular frame. The angle bars 62 are arranged to provide a flat upper surface 65, shown in FIG. 4, and a depending peripheral flange 67, shown in FIG. 5. Two ribs 70 are welded to the frame 60 at one end thereof adjacent the outside side edges, and two other ribs 72 are welded to the frame at the other end, laterally offset from the ribs 70 toward the longitudinal centerline of the frame 60. The legs 40 are pivotally attached to the ribs 70 and 72 by way of slots 75 in the upper ends of the legs and pivot pins 77 which extend through the ends of the legs and the ribs to pivotally pin the legs 40 to the ribs 70 and 72. This allows the legs to lie parallel to each other and within the confines of the table frame peripheral flange 67, producing a compact package.

Figure 7:
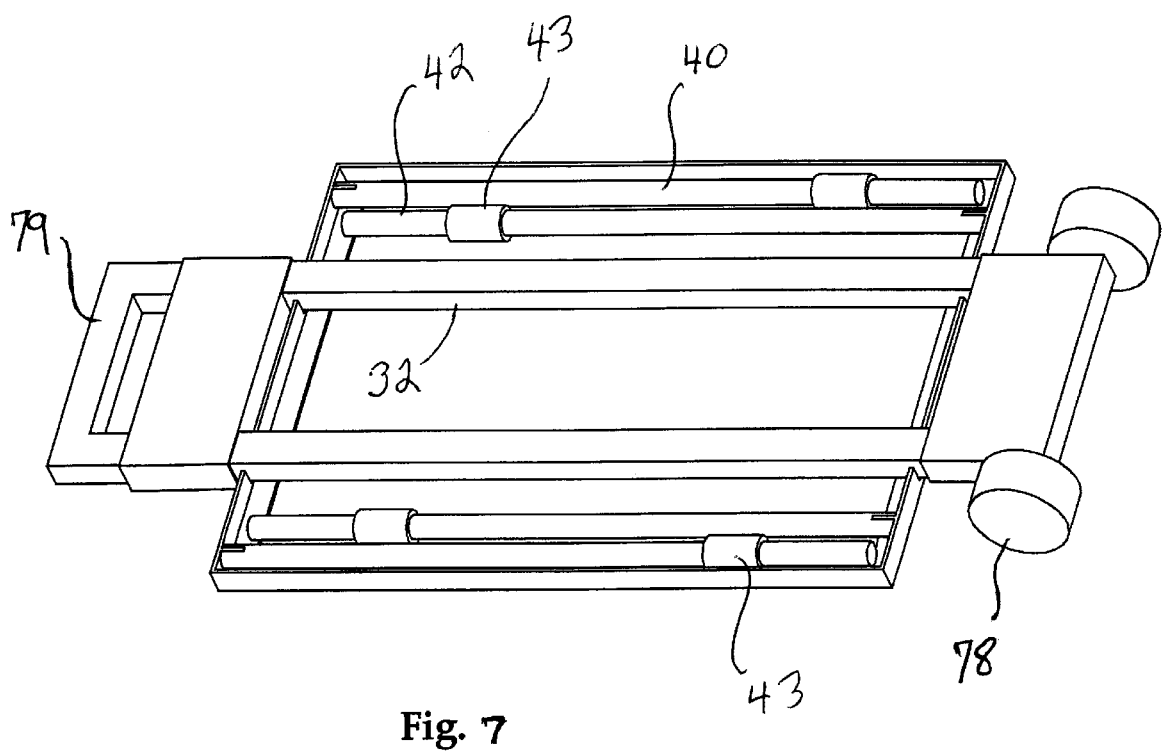
FIG. 7 is a perspective view of the table frame and legs shown in FIG. 6, with the trolley attached.

The trolley 30 has a trolley body 32 with pair of wheels 78 at one end and a handle 79 at the other end for easily wheeling the trolley and the attached case 50 and table 35 (with legs folded, as shown in FIG. 2) through airports, parking lots and even over rough ground. The trolley 30 is held to the table frame 60 with either thumbscrews or pressure clips, allowing the trolley 30 to snap into position on the table frame. Slots 80 are provided on the ends of the table flange 67 as shown in FIG. 1, or the trolley body could be provided with slots to allow the trolley and table frame to nest securely, as shown in FIGS. 2 and 7. The trolley/frame/ legs assembly then connects to the case via two case latches 82 that are attached at the ends of the base of the case 50. Trolley locking mounts 85 attach to these latches and hold everything together tightly while at the same time allowing a quick release of the case from this trolley in such case in needs to be totally removed. When the case 1 is removed, the frame and the trolley remain together via the thumbscrew connection and clips mentioned above.

Some users may want to use these parts separately. For example, they may want to use the trolley without the table and legs. The parts can be easily separated as shown in the exploded view of FIG. 1.

FIG. 4 shows the invention in a state where the legs are extended. This figure shows the invention without the case 50 attached to give a better view of the construction in an open position ready for deployment to a field or office environment. The frame 67 becomes locked between the trolley and the case when everything is connected.

FIG. 3 shows the fully deployed position of the case 50 with the lid 52 removed and the working surface of the base 55 visible where the working components (not shown) of the system would be accessible, i.e. laptop, printer, medical diagnostic equipment.

Figure 8:
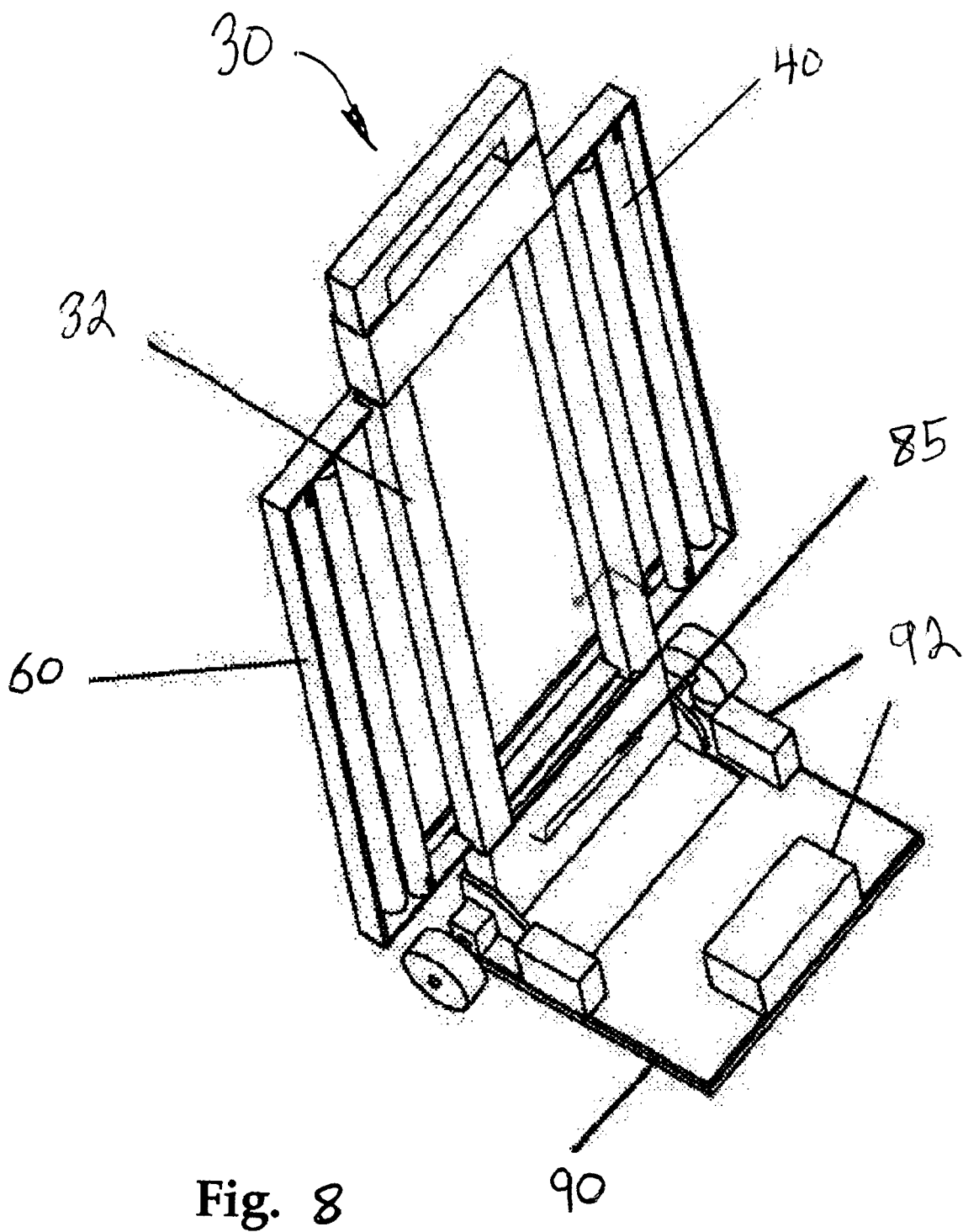
FIG. 8 is a perspective view of another embodiment of the apparatus according to this invention, showing a plate mechanism that holds the mounted case in an upright standing position without any other support.

A variation of the invention, shown in FIG. 8, includes a standing support plate 90 attached to the trolley 30 to make the entire assembly self-standing. This plate makes the trolley practical when rolling the case through airports, etc. by giving the entire assembly an ability to stand in a balanced upright position without the need to hold it upright. The plate has several plastic support blocks 92 that are dimensioned to properly support the case 50 in a balanced position. The plastic support blocks 92 are positioned so they don't obstruct the plate 90 after removal of the case 50 when the plate 90 is rotated upward to a closed position on the trolley. An additional pair of trolley locking mounts 85 are provided on the opposite side of the trolley 30 in this embodiment to secure the case in position over the plate 90 and also to lock the plate 90 in an upright position when closed. The standing support plate is held in place and allowed to rotate by the trolley axle. The case 50 would be removed and repositioned on the other side of the trolley 30 and table frame 60 when erecting the apparatus of this embodiment.

Obviously, numerous modifications and variations of the several embodiments described above are possible and will become apparent to those skilled in the art in light of this disclosure. Also, many functions, objects and advantages are described in the preferred embodiments, but in some uses of the invention, not all of these functions, objects and advantages would be needed, desired or attained. Therefore, I contemplate the use of the invention using fewer that the complete set of noted functions and advantages. Moreover, several species and embodiments are disclosed herein, but not all are specifically claimed in species claims, although all are covered by generic claims. Nevertheless, it is my intention that each and every one of these species and embodiments, and the equivalents thereof, be encompassed and protected within the scope of the following claims, and no dedication to the public is intended by virtue of the lack of claims specific to any individual species. Accordingly, it is expressly intended that all the disclosed species and embodiments, and the various modifications and variations, and the equivalents thereof, are to be considered within the spirit and scope of the invention as defined in the following claims, wherein.

I claim:

1. An apparatus that is convertible between a trolley configuration and a table configuration, for providing a wheeled carriage for a case in said trolley configuration, and for providing a supporting table with legs to support said case at a convenient working height for said case in said table configuration, said apparatus comprising:

a table frame having a supporting surface on a support plane;

four legs pivotally attached to said frame and movable between a folded position lying parallel to said support plane and an extended position rotated through an angle slightly greater than ninety degrees to said support plane to support said table frame at said convenient working height with said four legs resting upon a ground surface;

a trolley having a trolley frame with a handle at one end and two wheels at an opposite end upon which said trolley may be rolled over the ground surface, said table frame being configured to lie against said trolley frame and be detachably connected thereto, and said table frame being juxtaposed with and parallel to said trolley frame when connected thereto to form said support plane; and a case having a base and a lid removably received on said base, said base adapted to receive and hold instruments to be deployed in said apparatus, said base being configured to lie against said support plane formed by said table frame, and said base having at least one case latch by which said base is removably attached to said trolley frame.

2. An apparatus as defined in claim 1, wherein:

said table frame is made of angle bars forming a depending peripheral flange which encompasses all four of said legs when folded to said folded position.

3. An apparatus as defined in claim 1, further comprising:

a standing support plate attached to said trolley, to frame make said apparatus self-standing without external support.

4. An apparatus as defined in claim 3, further comprising:

support blocks fastened to an upper surface of said support plate dimensioned to support said case in a balanced position.

5. An apparatus as defined in claim 4, wherein:

said support blocks are positioned on said support plate to nest with said trolley frame when said plate 90 is rotated upward to a closed position on said trolley frame.

6. An apparatus as defined in claim 3, further comprising:

a pair of bottom-side trolley locking mounts on said trolley frame to secure said case in position over said support plate, and also to lock said support plate position when closed.

7. An apparatus as defined in claim 1, further comprising:

pair of top-side trolley locking mounts on said trolley frame to engage said case latch to secure said case to said trolley frame and to said table frame.

8. An apparatus as defined in claim 1, wherein:

said legs have telescoping structure which enables said legs to be lengthened to said convenient work height.

9. An apparatus as defined in claim 8, wherein:

said telescoping structure includes telescoping leg extensions and a locking clamp to secure said leg extensions at desired extended.

10. An apparatus as defined in claim 1, wherein:

said table frame has depending ribs parallel to said legs, and said legs have slits to receive said ribs; and hinge pins extend through upper ends of said legs and said ribs to pivotally attach said legs to said table frame.

* * * * *